United States Patent [19]

Levy et al.

[11] 4,366,873

[45] Jan. 4, 1983

[54] ELECTRONIC SCALE FOR USE IN A WEIGHT CONTROL PROGRAM

[75] Inventors: Michael Levy, Plantation; William P. Porter, Coral Springs; Kiran Gandhi, Pembroke Pines; Rick McKay, Miami, all of Fla.

[73] Assignee: Lexicon Corporation, Miami, Fla.

[21] Appl. No.: 145,842

[22] Filed: May 1, 1980

[51] Int. Cl.³ .......................................... G01G 19/44
[52] U.S. Cl. .................................. 177/25; 177/45;
177/DIG. 6; 179/1 SM; 340/692; 364/567;
364/710
[58] Field of Search ................. 177/1, 25, 45, 50, 245,
177/DIG. 3, DIG. 6; 179/1 SM; 364/710, 567;
340/692; 360/12; 369/69

[56] References Cited

U.S. PATENT DOCUMENTS

| 2,065,964 | 12/1936 | Brown | 177/245 X |
| 3,666,031 | 5/1972 | Provi | 177/186 |
| 3,853,191 | 12/1974 | Yamagiwa | 177/210 R |
| 3,870,818 | 3/1975 | Barton | 179/1 SM |
| 3,967,690 | 7/1976 | Northcutt | 177/25 |
| 4,082,153 | 4/1978 | Provi | 177/177 |
| 4,113,039 | 9/1978 | Ozaki | 177/25 |
| 4,117,461 | 9/1978 | Kiebala | 340/692 X |
| 4,270,852 | 6/1981 | Suzuki | 354/289 X |
| 4,318,447 | 3/1982 | Northcutt | 177/25 |

FOREIGN PATENT DOCUMENTS

2825095  3/1980  Fed. Rep. of Germany ... 177/25 X

Primary Examiner—Joseph W. Hartary
Attorney, Agent, or Firm—Cushman, Darby & Cushman

[57] ABSTRACT

An electronic scale for use in a weight control program in which the weighing histories and desired weight goals for each of a number of individuals are stored. A weigh signal is produced when an individual steps onto the platform of the scale, and the weight is displayed on the top of a column upstanding from the base and spoken. Following entry of information identifying the individual into a keyboard also atop the column, a microprocessor assembles two types of messages, at least one informational and at least one psychologically reinforcing, from stored message components in accordance with the identified individual's stored weighing history and stored desired weight goal and the message is spoken. In response to manual operation of other keys, the scale can calculate any individual's ideal weight goal and can review his stored weight history.

15 Claims, 12 Drawing Figures

ELECTRONIC SCALE FOR USE IN A WEIGHT CONTROL PROGRAM

The present invention relates to an electronic scale having structure and capabilities which provide for effective use in a weight control program.

Losing weight is a preoccupation of many millions of people around the world. Billions of dollars are spent each year by consumers on diet foods, low calorie beer, health clubs, memberships in various weight watching groups, exercise equipment, diet pills, diet books and scales. While such items probably do little harm and may provide some disciplined individuals with the necessary tools for losing weight, they have not been effective for most people who need to lose weight, or even for those people who want to gain weight.

Most experts in the field of weight reducing now understand that for most individuals weight can be lost for an extended period of time only through an effective program which emphasizes modification of eating behavior and patterns and psychological support and understanding for the dieter.

Ordinary bathroom scales which provide a display of the weight of the individual standing on the base thereof, even those which provide a digital display, are an ineffective tool in a weight control program. Scales have been proposed, for example, as described in U.S. Pat. Nos. 4,113,039 and 3,967,690, which compare the present weight with an ideal range. However, this naked comparison is not enough. High accuracy also is important as emphasized in U.S. Pat. No. 3,967,690, but by itself is not enough.

At the time of each weighing, the person in the program needs a positive conditioning or a psychological reassurance, depending on whether he or she has lost weight, gained weight, or remained at the same level. The person needs to see that he or she is making progress and will achieve his or her goal if he or she continues with the program. Most individuals who fail in a weight control program do so because they inevitably depart from the program, and feel that further participation would be hopeless. Suitable reassurance and psychological conditioning to prevent this drop out is required.

The present invention is an effective tool in a weight control program because it provides the necessary reassurance and positive conditioning. This is achieved according to a number of different aspects of the present invention. The scale includes, like any other scale, a base with a platform on which the individual stands, and associated structure for producing a signal indicating the weight of that individual. However, the present invention also includes a memory which preferably stores the previous weighing history of the individual, e.g., a number of previous weighings and also preferably stores a desired weight limit or goal for that individual. The scale is accurate, preferably to within ½ lb. The scale also preferably can be used by a number of different individuals, e.g., in a family and stores that same information for each individual. The scale includes means, e.g., a microprocessor, for causing at least one message to be produced in accordance with the present weight and both the stored weight limit or goal and the stored weighing history. That message may be a psychological message indicating to the person in the program that he or she is proceeding satisfactorily, or providing a psychological conditioning which will enable him or her to continue in the program. Preferably, the scale provides two or more successive messages to be given—at least one reinforcement message and at least one informational message. A keyboard is preferably provided for manually entering information, including the identity of the individual being weighed.

The stored weight goals for each of the individuals in the weight control program using the scale are preferably determined either by entry of information into the keyboard, e.g., indicating the sex, height, age and frame size of the individual, or in accordance with manually entered information indicating that specific individual's desired weight goal.

The message given by the scale is preferably an audio message produced according to known techniques, and following a first audio command requesting the individual to enter information identifying him or her so that the associated stored weight limit and weighing history information can be utilized by the microprocessor to assemble an appropriate message from stored message components.

The stored weighing history can also be provided to the individual in the program by manual operation of the appropriate key on the keyboard, thus providing another reinforcement technique as the individual reviews his progress. The keyboard and an electronic display are preferably mounted on a column upstanding from the base on which the individual stands so as to be readily accessible and viewable by most individuals on the platform. In the base a timing wheel is preferably mounted for rotation in the same way as similar structures in conventional bathroom scales. On the timing wheel a plurality of optically detectable indicia, e.g., opaque radial bars, are provided so that pulse trains are produced by each of two optical pick-ups mounted adjacent to the timing wheel. These pulse trains are compared in phase in order to ascertain the direction of rotation of the wheel, and control up or down counting of the pulses, the count then indicating the weight of the individual.

Many other aspects and purposes of the invention will be clear from the following detailed description of the drawings.

DETAILED DESCRIPTION OF THE DRAWINGS

Figure 1:
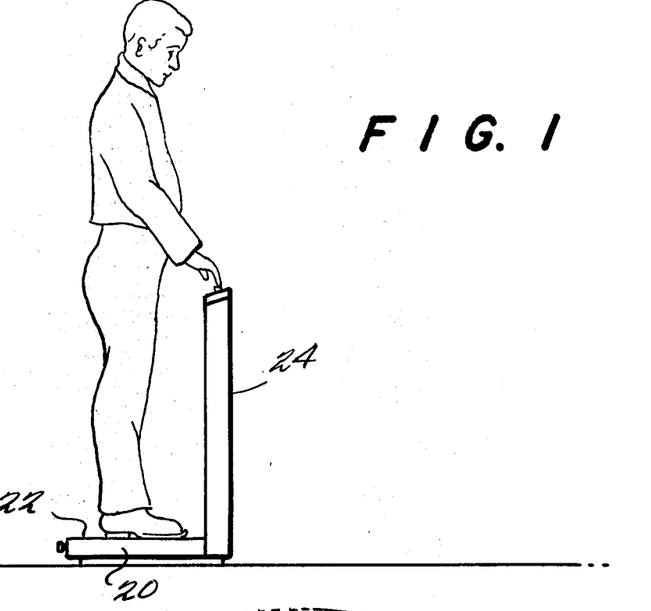
FIG. 1 shows a schematic view of the scale of the present invention in use.
Figures 2, 2A:
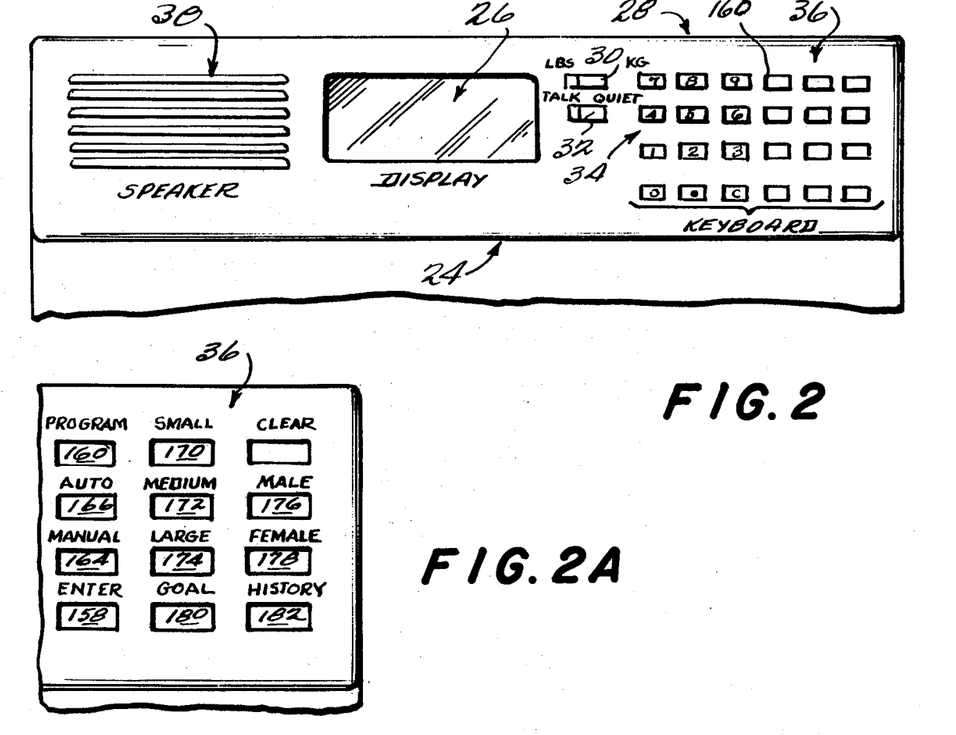
FIG. 2 shows a top view of the keyboard, display and speaker which are mounted atop the upstanding column of the scale shown in FIG. 1
FIG. 2A shows an enlarged view of part of the keyboard.

FIG. 1 shows the unique scale of the present invention in use by an individual who thus participates in an effective weight control program. The scales include a base 20 having a platform 22 onto which the individual steps to initiate weighing. Column 24 is upstanding from base 20 and attached thereto by any suitable means. As shown in FIGS. 1 and 2, column 24 extends upward sufficiently for conventional LED display 26, keyboard 28 and slide switches 30 and 32 to be readily accessible and viewable by most adults standing on base 20. Base 20 and column 24 may be made of any suitable material, e.g., molded plastic or the like, which has sufficient strength and satisfactory appearance.

Referring to FIGS. 2 and 2A, the keyboard 28 includes keys 34 for entering numerical information and a plurality of control keys 36 for causing retrieval and either display or production of audio messages indicating the previous weighing history, stored or calculated weight ranges, etc.

Slide switch 30 has two positions, one indicating that all information is to be entered and displayed in the English weight system, and the other indicating that all information is to be displayed and entered in Metric units. Slide switch 32 in a first position renders the speaking capability of the system inoperative as discussed in detail below, and in a second position permits that system to operate. Conventional speaker 38 is also mounted on the top of the column for producing the audio messages when switch 32 is in the position enabling operation thereof.

Figure 3:
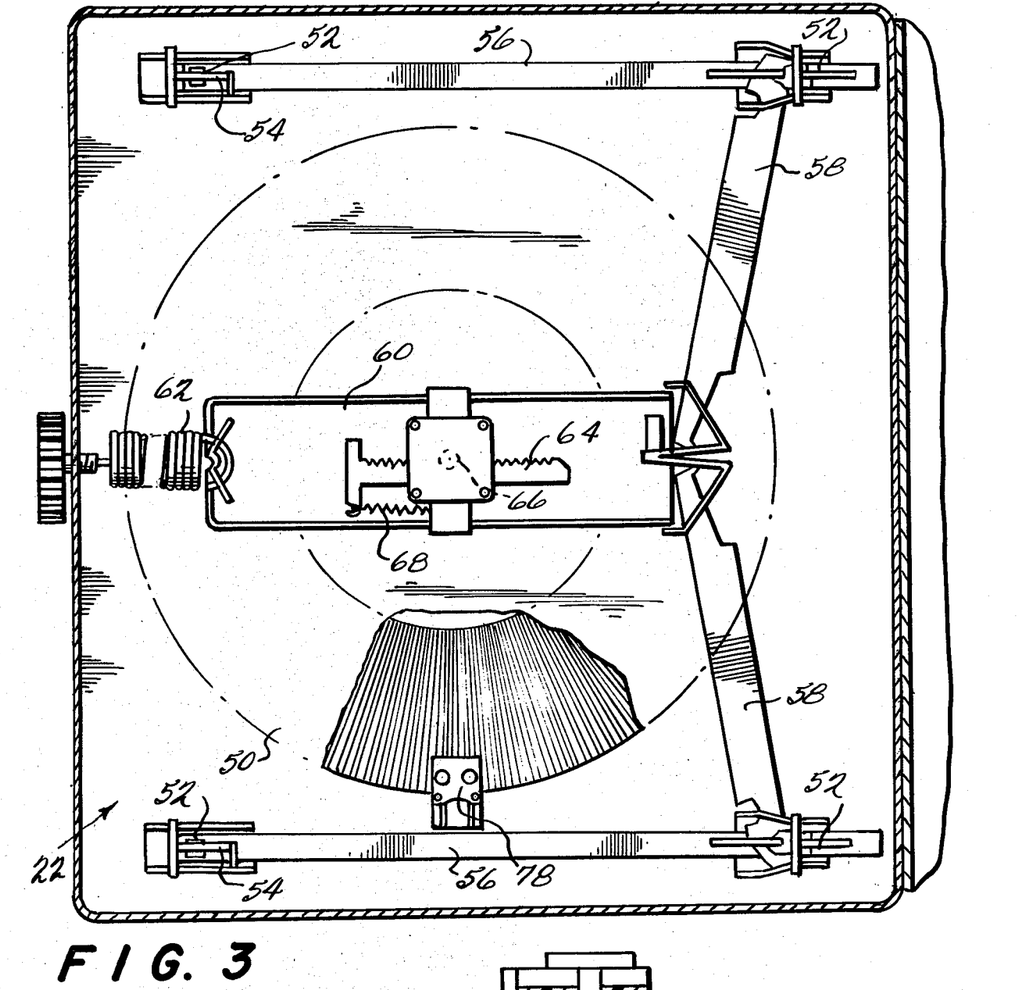
FIG. 3 shows a partial sectional view of the base showing the conventional structure for causing rotation of the timing wheel and the sensors.

Referring to FIG. 3, the base of the scale includes conventional structure for causing rotation of timing wheel 50 in one direction in response to an individual stepping onto platform 22, each increment of rotation indicating an increment of weight. With the exception of the timing wheel shown in FIG. 4, and the sensor shown in greater detail in FIG. 5, the mechanical components in the base of the scale which effect rotation of the timing wheel are conventional and are as described in greater detail in U.S. Pat. No. 3,666,031 to Provi et al, the disclosure of which is hereby incorporated by reference.

Four small vertically disposed crank levers 52 have hangers 54 conventionally fulcrumed thereon to support platform 22 at four widely spaced points. Horizontally disposed bars 56 are reciprocable in response to downward movement of platform 22 and this reciprocable motion is multiplied by two elongated weighing levers 58 that are operatively connected with bars 56 at their outer ends and with their inner ends connected to horizontal plate 60. The other end of plate 60 is attached to one end of weighing spring 62. Plate 60 carries a rack 64 which meshes with a pinion 66 which in turn is coupled to wheel 50 to rotate the same. Spring 68 holds rack 64 against pinion 66.

Figure 4:
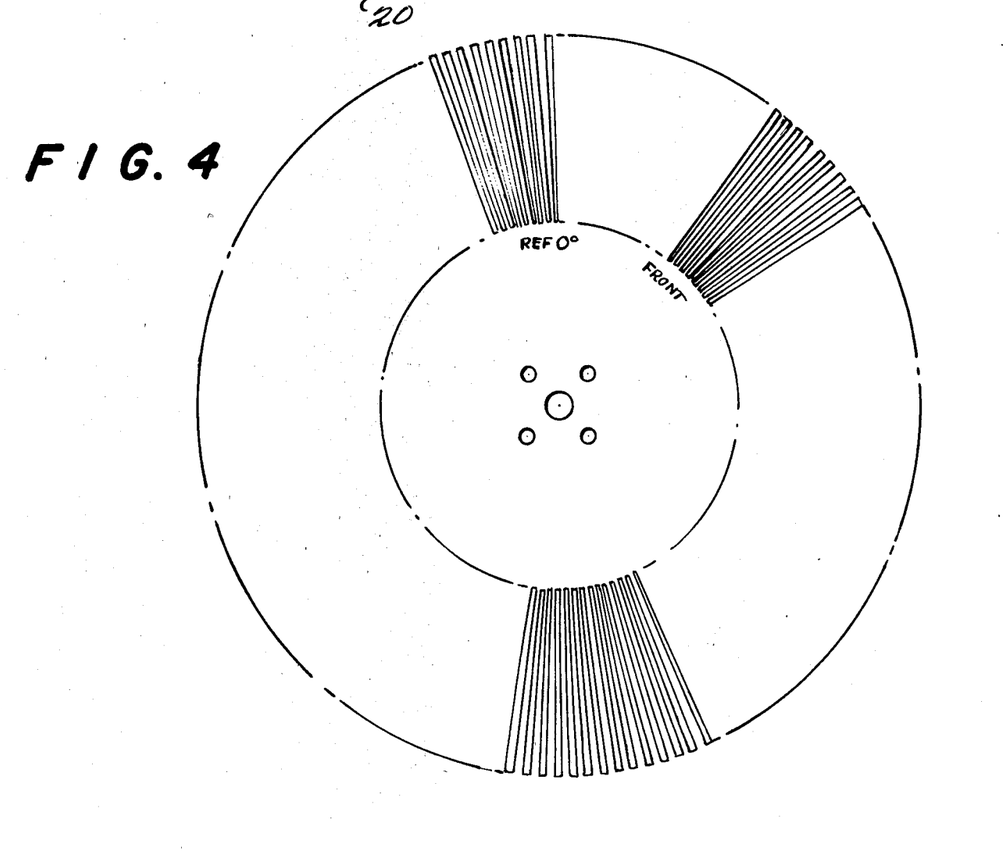
FIG. 4 shows a top view of the timing wheel.
Figure 5:
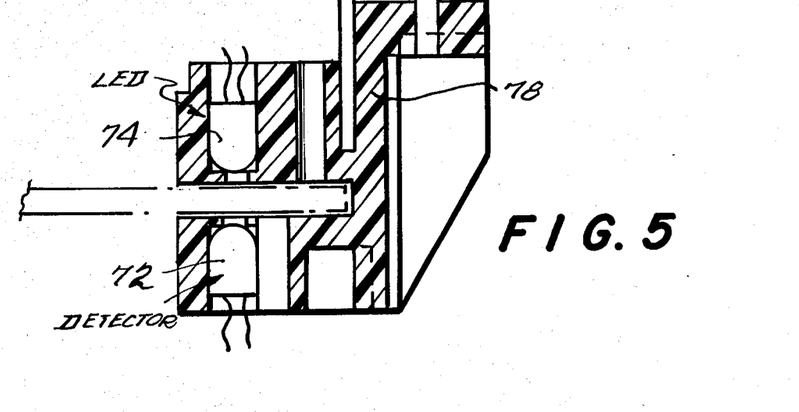
FIG. 5 shows a sectional view of the sensor producing the two pulse trains which are counted to determine the weight of the individual on the platform.

Timing wheel 50 as shown in FIG. 4 includes a plurality of opaque radial bars along the periphery thereof to periodically interrupt the light between a pair of light emitting diodes as shown in FIG. 5 and associated detectors 70 and 72. Diode 74 and detector 72 can be seen in FIG. 5 but the other diode 76 and detector 70 (shown in FIG. 7) are hidden in that view. The diodes and detectors are conventional and are mounted in holder 78 which may be of any suitable material. The periphery of the wheel which would be associated with the first thirty pounds of weight is preferably left blank to avoid errors.

Figure 8:
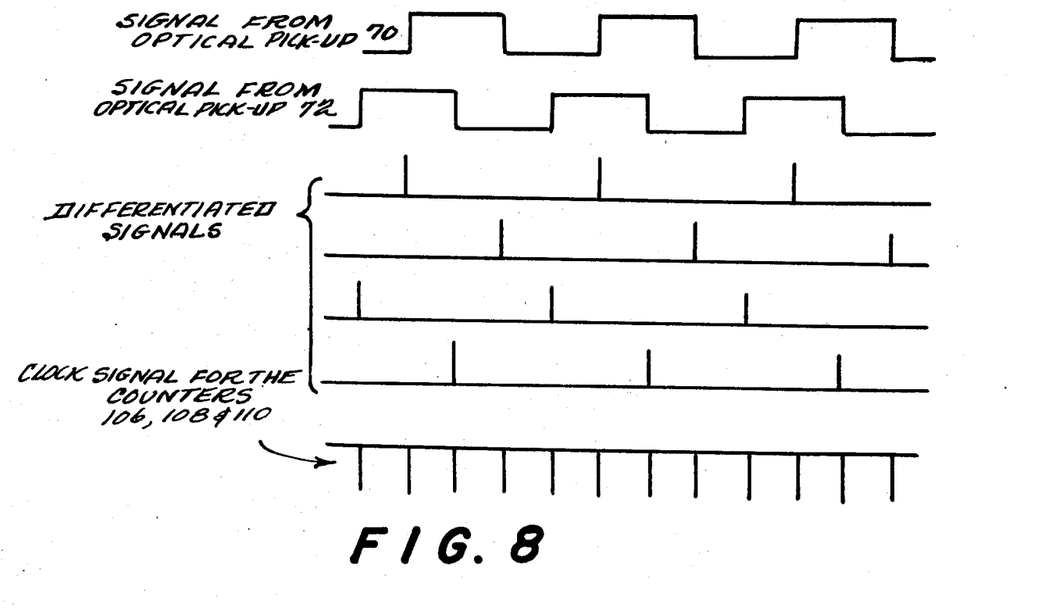
FIG. 8 shows a signal diagram of the pulses which are produced by the optical pick-up and counted.

When an individual steps on the scale, rotation of the timing wheel in response thereto produces two pulse trains shown in FIG. 8 which are utilized to produce a count indicating the weight and a weigh signal which is then stored and utilized by the computer to produce a message.

Two types of messages are preferably spoken in sequence—reinforcement phrases and informational phrases. Reinforcement phrases are chosen in accordance with the stored weighing history and the stored weight limit. A set of reinforcement phrases is stored for each of the following categories.

Categories of Response

I. Introductory (First Weighing)
  A. At Goal (15 statements)
  B. Within 15 pounds of programmed goal (20 statements)
  C. Exceeds 15 pounds of programmed goal (15 statements)
II. Reaches Goal
  A. Reaches intermediate goal (18 statements)
  B. Reaches final goal (24 statements)
III. Decreasing Weight
  A. Close to goal (less than 5 pounds from your goal) (25 statements)
  B. Decrease (below initial weight more than 5 pounds less than 10 pounds from goal) (25 statements)
  C. Decrease (more than 10 pounds from goal) (25 statements)
IV. Increasing Weight
  A. Within 15 pounds of goal (91 statements)
  b. More than 15 pounds from goal (20 statements)
V. Plateau
  A. Within 5 pounds of goal (12 statements)
  B. Between 10 and 15 pounds from goal (13 statements)
  C. At goal (18 statements)

Each reinforcement phrase is paired with at least one informational statement. Examples of informational statements include:

"Eat only at the same table at each meal"
"Exercise every day"
"Always eat before you shop for food"

Examples of reinforcement phrases include:

"Great" (losing weight)
"Your diet is working" (At goal)
"I cannot take more of this" (Gaining weight)

Storing as few as 134 words permits assembling several hundred different messages.

The responses provided by the scale to the weighee are generally very positive when the weighee shows a decrease in weight. Responses tend to become more sarcastic and biting as the weighee moves away from his/her goal to the point that the scale will not talk to an individual who exceeds their goal weight by more than 15+ pounds. At this point, the display blinks and the scale tells the weighee to reset his/her goal weight to a figure not more than 15 pounds from his/her present weight.

Informational statements regarding weight loss are attached to reinforcement statements in all cases except where the weighee is at the final goal weight. These information statements might be repeated to emphasize their importance. In some cases, instructions are given to "practice new eating behavior for 3 days."

Highlights could be added if, when reaching a goal the scale had sound effects such as applause, cheers, etc. and perhaps some lighting effects. Further, if a person exceeds their goal by 15 pounds something like "TILT" and/or "gross" may add to the negative reinforcement.

Figure 6:
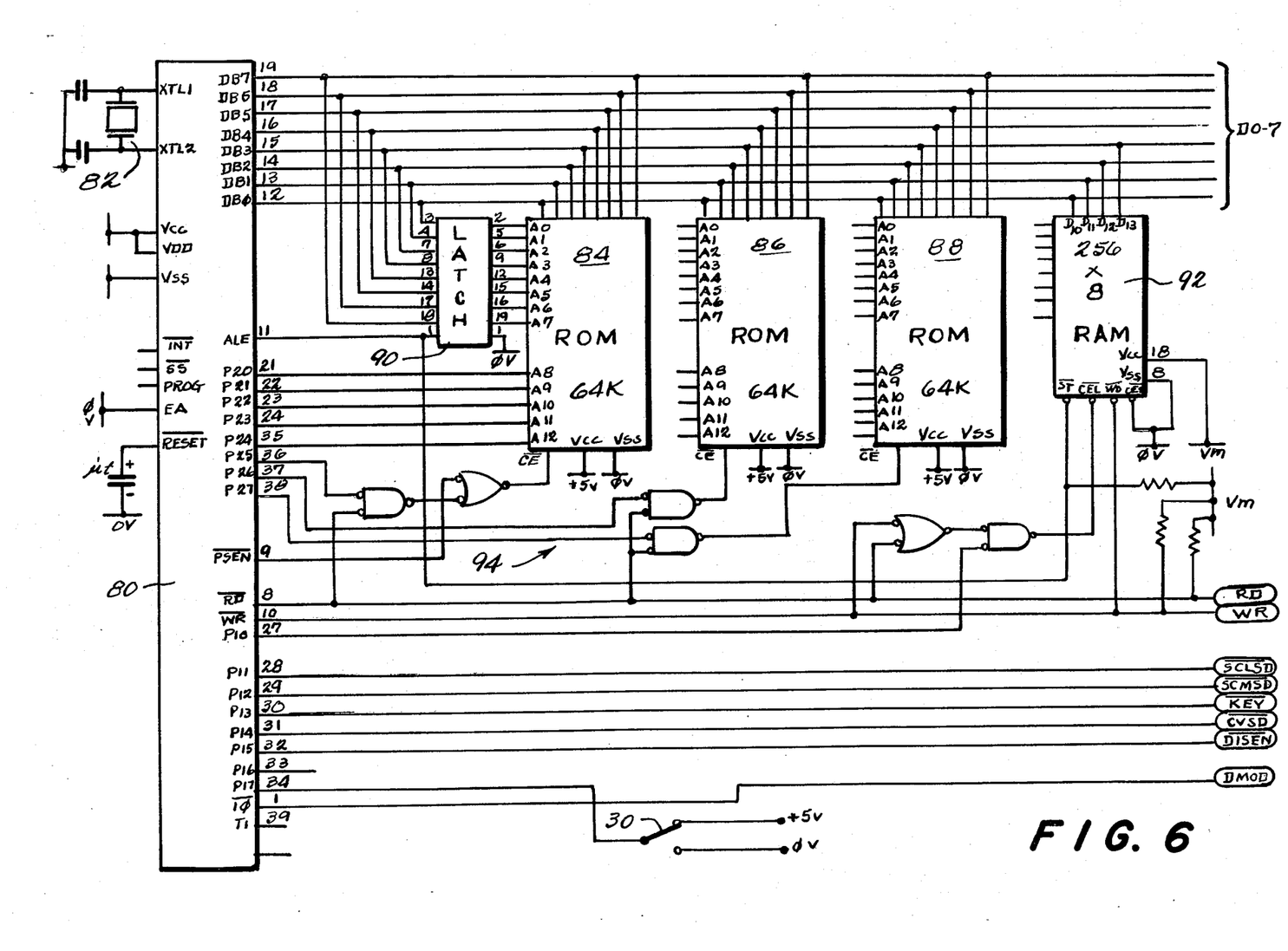
FIG. 6 shows a schematic of the microprocessor and associated memory.

Referring now to FIG. 6, microprocessor 80, e.g., an Intel microprocessor with 2K internal ROM and 128 bytes in the RAM is utilized as the computer to carry out the unique functions of the present invention. A clock oscillator 82 is connected to the processor 80 to provide timing. 64K ROMS 84, 86 and 88 store the program and the audio message components. ROMS 84, 86 and 88 are conventionally adressed by storage latch 90. RAM 92 stores the previous weighing history, the starting weight and the goal. RAM 82 and ROMS 84, 86 and 88 are selected by the conventional chip select logic generally indicated at 94 and addressed conventionally on a common bus. Switch 30 is connected to indicate whether information is to be entered and displayed in the Metric system or in the English system.

Figure 7:
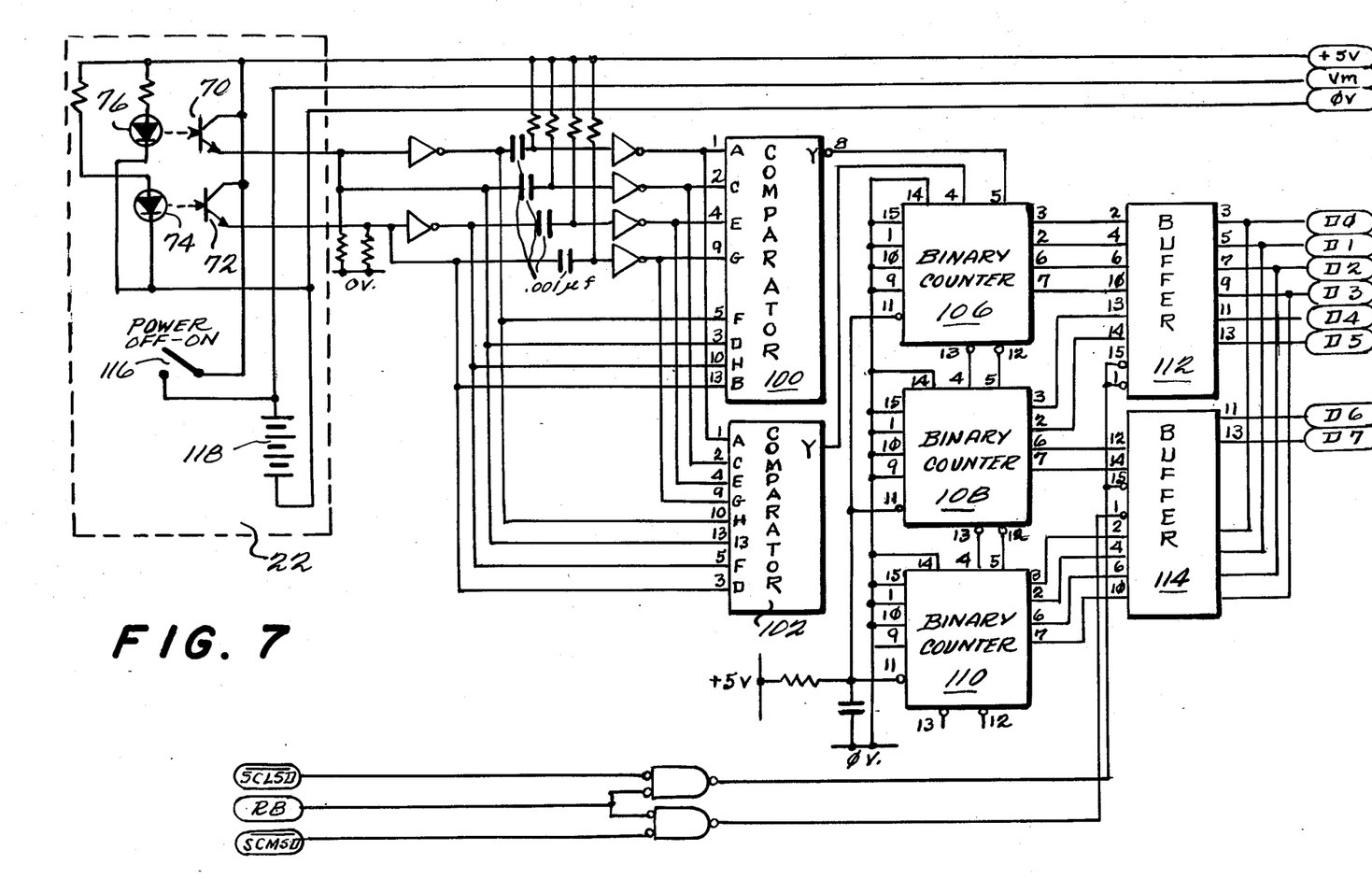
FIG. 7 shows a schematic of the circuitry for counting the pulses and producing a weigh signal indicating the weight of the individual on the base.

FIG. 7 shows the circuitry for producing the two pulse trains which are counted in order to produce a signal indicating the weight of the individual on platform 22. Conventional optical detectors 70 and 72 produce pulses as shown in FIG. 8 which are debounced and applied to comparator circuits 100 and 102 which apply enabling signals to either the up or down inputs to binary counters 106, 108 and 110 which are connected to optical detectors 70 and 72 to provide a weigh signal as an output to buffers 112 and 114 indicating the number of counts.

The two photodetectors 70 and 72 are mounted to produce pulse trains 90° out of phase. The leading edges of the trains are differentiated as shown in FIG. 8 and applied to comparators 100 and 102. In effect the comparators act like NAND gates to gate the differential pulses during one or the other train, depending on the direction of rotation of wheel 50 and, accordingly, the phase relation between the two pulse trains.

The contents of buffers 112 and 114 are periodically read by processor 80. Switch 116 in base 22 is closed to supply power to the unit from batteries 118 when anyone steps on platform 22 and opens when the platform is vacated.

Figure 9:
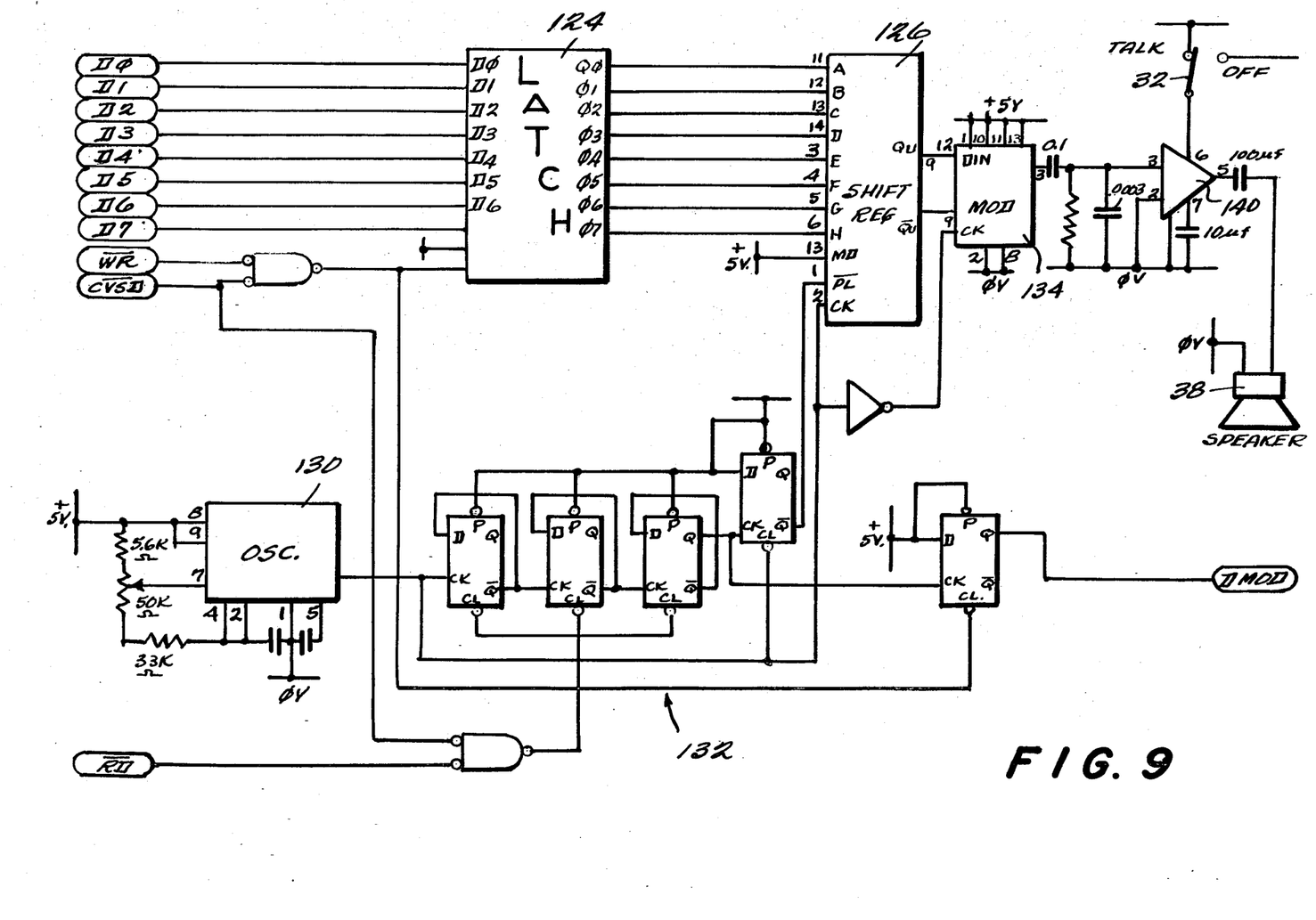
FIG. 9 shows a schematic of the circuitry for producing audio messages and commands.

FIG. 9 illustrates the circuitry for controlling the audio output to the speaker. The audio information is placed in latch 124 by microprocessor 80 and moved into the register 126 in accordance with the timing information provided by timing chip 130 which functions as an oscillator and timing chips 132. Conventional delta modulation circuit 134 produces an audio signal which is amplified by audio amplifier 140 and applied to speaker 36. Switch 32 is connected to amplifier 140 to disable the same when the switch is in the position indicating that no speaking capability is desired.

Techniques for assembling messages from stored message components using a microprocessor are well known and need not be discussed in detail. Delta modulation techniques in which stored binary representations are integrated provide satisfactory results and chips for that purpose are available from a number of sources. The HC-5516/55532 chip from Harris Semiconductor is satisfactory. Delta modulation and other approachs are discussed in detail in an article entitled, "Voice Input and Output" which appeared in the Nov. 20, 1979 issue of EDN Magazine.

Figure 10:
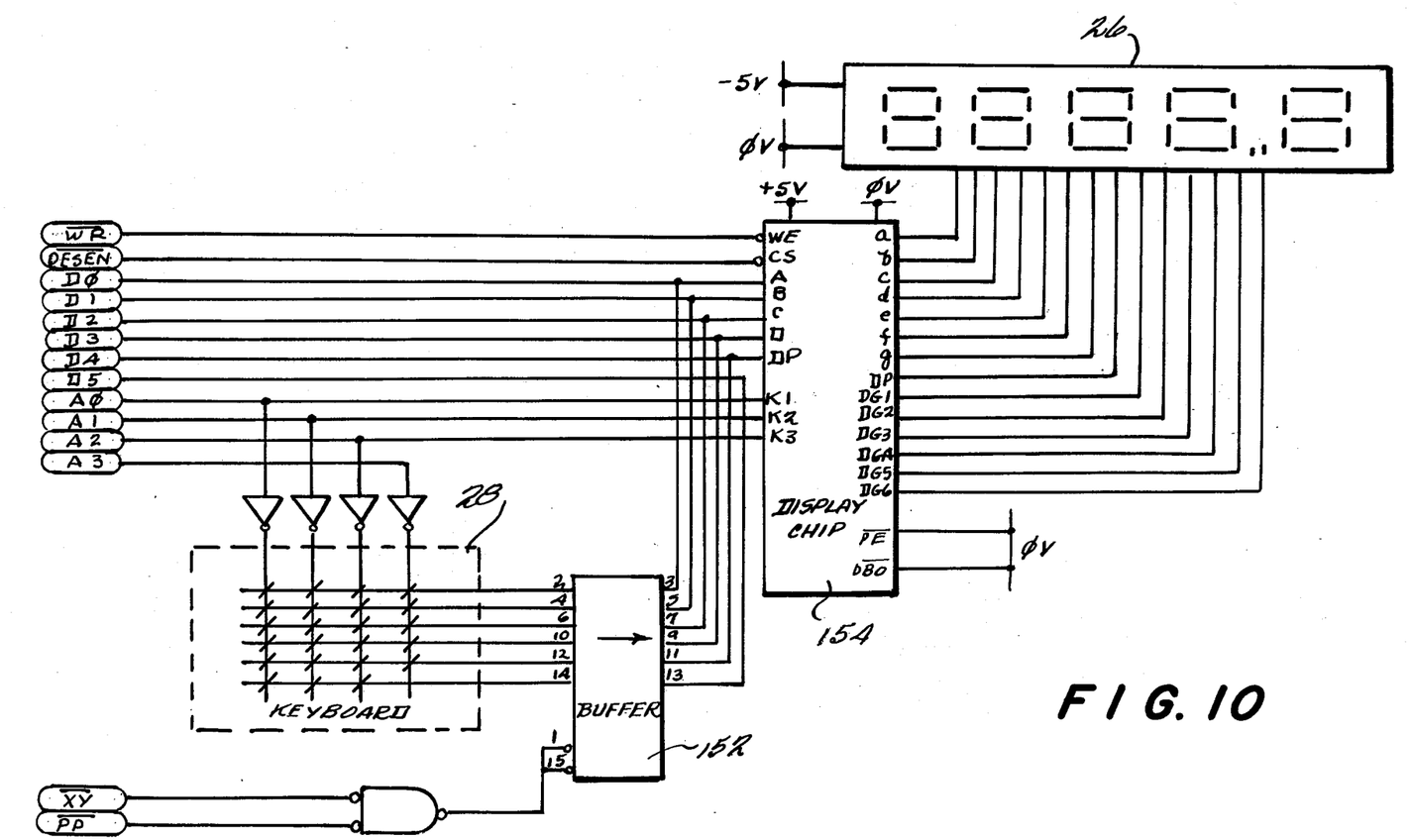
FIG. 10 shows a schematic of the display and display driving circuits.

FIG. 10 shows the LED display which may be any conventional type of display. Information to be displayed is placed by microprocessor 80 in buffer 152 and the information then displayed according to display chip 154. The conventional keyboard 28 is also coupled to buffer 152 for displaying entered data and to the data lines for transmitting that data and commands to microprocessor 80.

Figure 11:
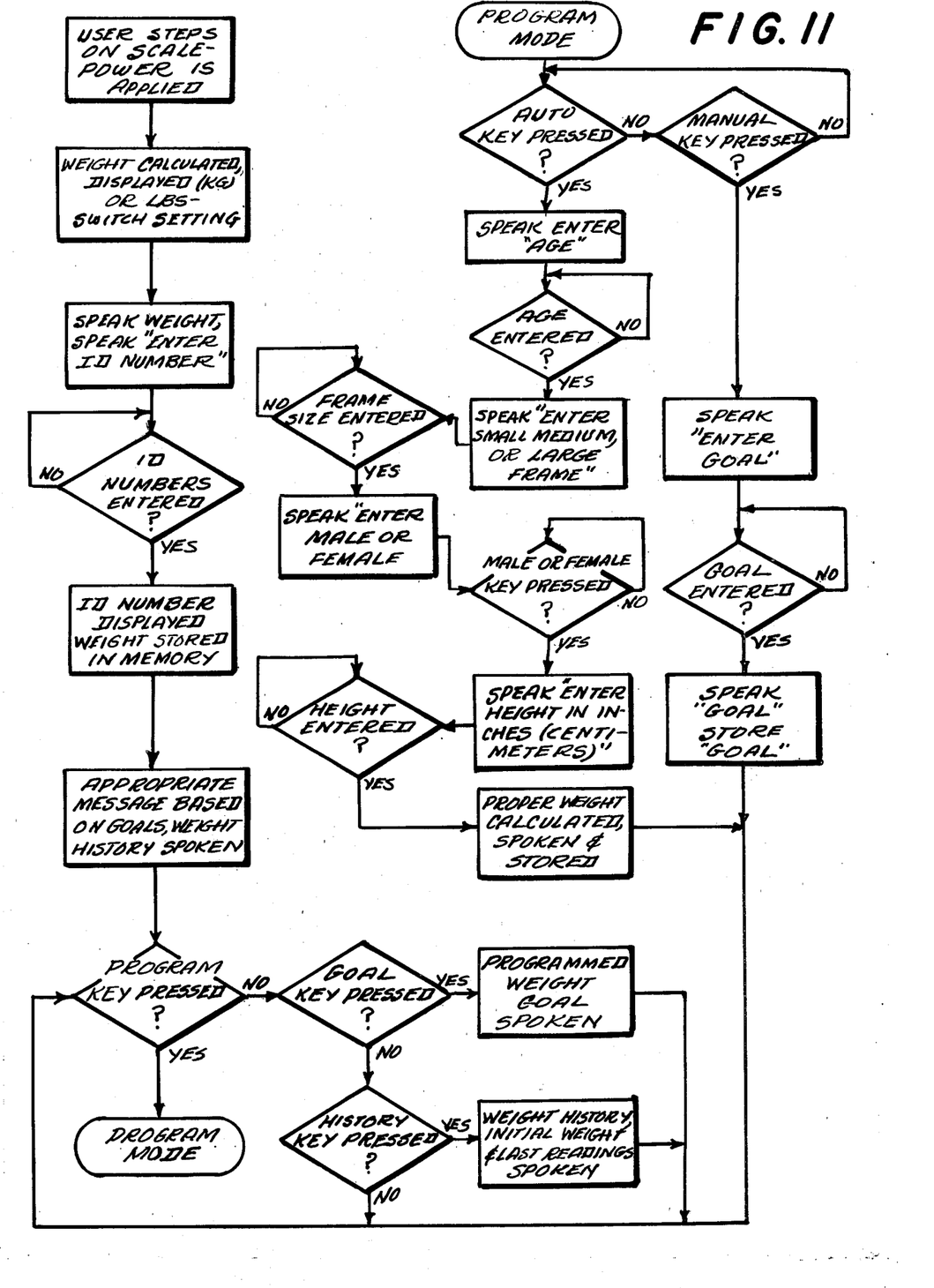
FIG. 11 is a flow sheet showing the overall operation of the scale.

Reference is now made to FIG. 11 which illustrates a flow chart for the program for implementing the functions described above. Stepping on the scale closes switch 116 to apply power to the system. The system calculates the weight of the person on the scale, displays that weight on display 26 in either kilograms or pounds, depending upon the setting of switch 30, and speaks the weight which has been determined. The scale then asks the user to enter his ID number.

At this point, the user may elect to step off the scale and terminate the program. Alternatively, he may enter his ID number into keyboard 34 which is then displayed and stored after the enter key 158 is manually operated. An appropriate message is then generated based upon the goal which has been previously determined or entered for that individual, his previous weighing history and his present weight as described above, assuming that such information is in storage. If such information is not stored, then the user now has the opportunity to do so. This is accomplished by pressing the program key 160 (in FIG. 2A) to enter the program mode. Following depression of the program key, the user has the opportunity to enter his personal weight goal which will then be stored and utilized, or to have the system calculate his weight limit or goal. If he elects to enter his own personal goal, he depresses manual key 164, and the machine responds by asking the user to enter his goal. This goal is entered by operation of the numerical keyboard 34 and the manual operation subsequent thereto of enter key 158. The goal is then stored and utilized as above.

If the user elects to have the machine calculate his goal for him, the auto key 166 is operated and the machine responds by asking the user to enter his age. The age is entered by operation of the numerical keyboard, followed by operation of the enter key 158. The machine now asks the user to enter either small, medium, or large frame and the user responds by operation of the appropriate key 170, 172 or 174. The machine next asks the user to enter male or female and the user responds by operating either key 176 or 178. The proper weight goal is then calculated from a stored formula or retrieved from a stored set of values and stored in the RAM 92.

The user also has the option to have his stored goal spoken by operating the goal switch 180 or to hear his previous weighing history, e.g., the initial weight plus the last eight readings, by operation of the history switch 182.

Many changes and modifications in the above-described embodiment can, of course, be carried out without departing from the scope thereof. Accordingly, that scope is intended to be limited only by the scope of the appended claims.

What is claimed is:

1. An electronic scale for use in a weight control program comprising:

a base including a platform for receiving an individual in said program to be weighed;

means within said base for producing a weigh signal and a weigh signal message indicating the weight of said individual on said base;

keyboard means having a plurality of keys for manually entering information and control signals;

said keyboard means including means for manually entering personal data or a weight goal and producing a signal indicating the desired weight goal for said individual or a personal data signal indicating said personal data;

memory means for storing a previous weighing history for said individual and a plurality of different spoken messages divided into categories with a plurality of messages in each category, each of said categories relating to a particular weighing history pattern and the relationship of weight to weight goal;

means for producing any one of said plurality of different spoken messages;

computer means, responsive to said keyboard, and said weight signal producing means, and connected to said message producing means and said memory means, for determining a weight goal in accordance with manually entered personal data and selecting at least one of said spoken messages from a category selected in accordance with an entered or determined weight goal, said stored weighing history and the difference between said weigh signal and said goal; and means for causing said selected message and said weigh signal message to be spoken.

2. A scale as in claim 1, wherein said weigh signal producing means includes:

a timing wheel having a plurality of optically detectable indicia about the periphery thereof;

means for rotating said wheel from a rest position in a given direction in response to weight on said platform, each increment of rotation indicating an increment of weight;

spring means attached to said wheel for urging said wheel in the opposite direction and returning said wheel to said rest position when said individual leaves said platform;

optical means disposed adjacent said wheel for detecting each of said indicia as said wheel is rotated to produce a train of pulses, each pulse indicating an increment of weight; and means responsive to said optical means for counting said pulses to produce said weigh signal.

3. A scale as in claim 2, wherein said optical means includes first and second optical detector means disposed adjacent said wheel for producing first and second pulse trains, the phase between said trains indicating the direction of rotation of said wheel and said weigh signal producing means includes means responsive to said first and second optical detector means for comparing said first and second pulse trains to produce an up signal when said wheel is rotating in a first direction and a down signal when said wheel is rotating in the opposite direction, said counting means being responsive to said comparing means and counting said pulses from said pulse producing means up and down in accordance with said up and down signals.

4. A scale as in claim 1 including further memory means connected to said computer means for storing weight goals for each of a plurality of individuals, said computer means determining a goal followed manual operation of a first key on said keyboard means and in accordance with information manually entered on said keyboard means indicating the sex, height, age and frame size of an individual and thereafter storing the determined goal and storing a goal following manual operation of a second key on said keyboard means in accordance with information manually entered on said keyboard indicating an individual's desired weight goal.

5. A scale as in claim 4 wherein said message producing means includes means for producing messages indicating stored weighing history and said computer means causes a message indicating the stored weighing history to be produced following manual operation of a third key on said keyboard.

6. A scale as in claim 4 including first switch means connected to said computer means for permitting entry of metric information in a first position and English information in a second position.

7. A scale as in claim 1, further including means for supplying electric power to said scale and switch means mounted in said base and electrically connected to said supply means for closing to supply power when an individual is on said base and opening when no individual is on said base.

8. A scale as in claim 1, wherein said memory means includes a random access memory (RAM).

9. A scale as in claim 8 wherein said computer means includes a microprocessor and at least one read only memory (ROM) connected to said microprocessor.

10. A scale as in claim 1, wherein said memory means stores a plurality of previous weighings for each of a plurality of different individuals and said keyboard means includes means for manually entering information identifying one individual, said computer means producing said one message in accordance with the stored previous weighings of the identified individual.

11. A scale as in claim 1 wherein said computer means includes a microprocessor which causes storage of a plurality of past weighing outputs of each of a plurality of individuals and a plurality of goals, each associated with one of said individuals, said weigh signal being compared with the goal associated with an individual identified by information manually entered on said keyboard means.

12. A scale as in claim 11 wherein said microprocessor causes said indicating means to produce a message in accordance with the past weighings of an identified individual and the stored goal associated with said identified individual.

13. A scale as in claim 1, further including display means, responsive to said computer means, for producing a visual display of the weight of said information.

14. A scale as in claim 13, including a column member upstanding from said base, said keyboard means and said display means being mounted on said column member.

15. An electronic scale as in claim 1, wherein said memory means stores a further group of messages different from the messages which are divided into categories and said computer means selects a message from said further group in addition to the message from the selected category.

* * * * *